Aug. 28, 1962        P. F. GRIEGER ETAL        3,051,831
CHARGING RACK FOR MINE LAMP BATTERY
Filed June 2, 1960
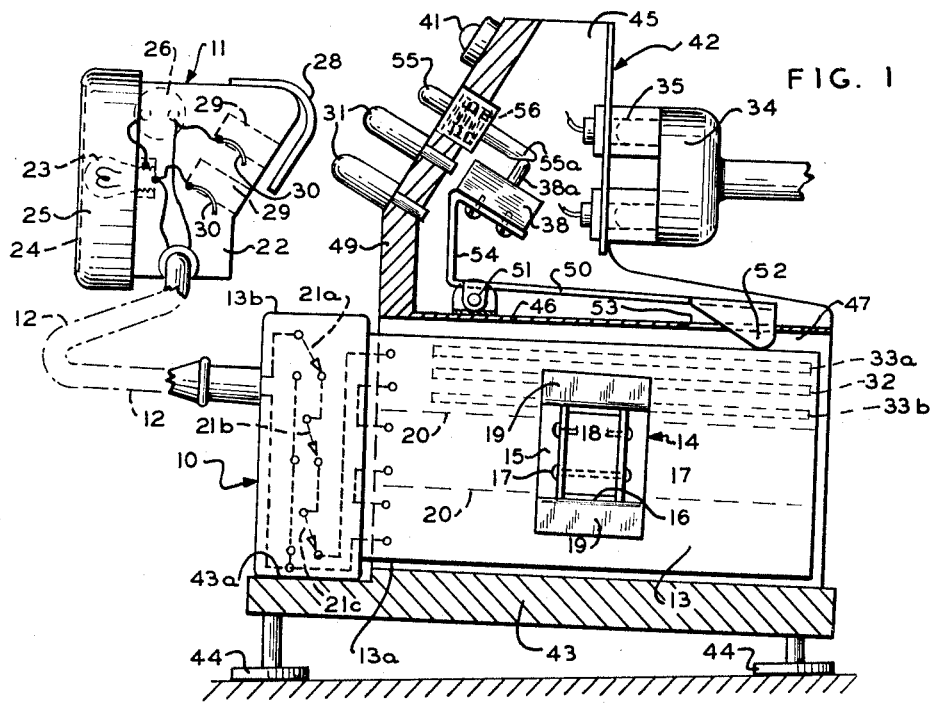
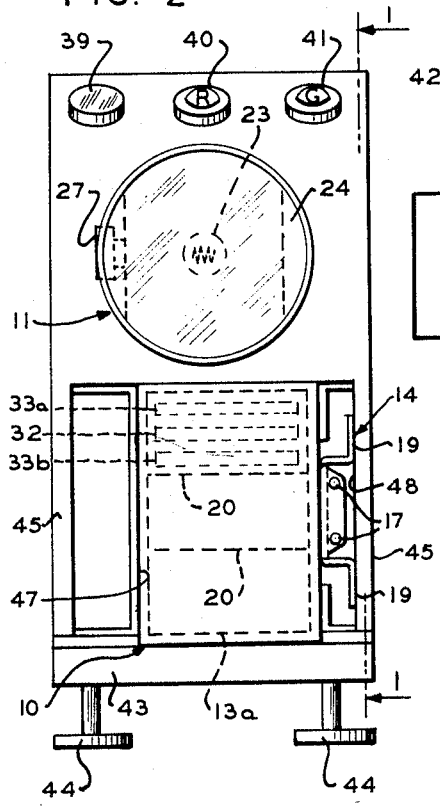
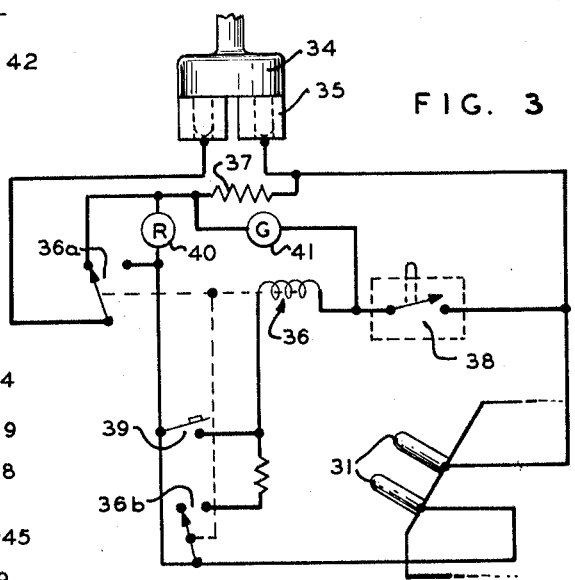
INVENTORS
PHILIP F. GRIEGER
ARTHUR FLEISCHER
BY George H. Fritzinger
AGENT United States Patent Office 3,051,831
Patented Aug. 28, 1962

3,051,831
CHARGING RACK FOR MINE LAMP BATTERY
Philip F. Grieger, West Orange, and Arthur Fleischer, Orange, N.J., assignors, by mesne assignments, to The Electric Storage Battery Company, Philadelphia, Pa., a corporation of New Jersey
Filed June 2, 1960, Ser. No. 33,576
4 Claims. (Cl. 240—11.3)

This invention relates to a charging rack for a sealed mine lamp battery of the type described in the pending U.S. application Serial No. 779,787 of Grieger and Evans filed December 11, 1958, and entitled Sealed Storage Cell and Charging Circuit Therefor.

A sealed storage cell of the type mentioned is typically of an oblong shape comprising nickel positive and cadmium negative electrode plates with a liquid electrolyte which completely covers the electrode plates when the battery is in a vertical position but which leaves a flat side of one cadmium negative plate exposed to the internal gas space when the battery is laid horizontally on one side of its case. The battery can be used during service discharge in any position but must be charged in the stated horizontal position wherein the cadmium negative electrode is exposed to the internal gas space in order to assure that the battery will be charged properly and to a state of full charge without undue build up of internal pressure.

The present invention resides in a charging rack for sealed cells of the character described, which is adapted to assure that the cells will be positioned properly during charge.

Objects of the invention are to provide a novel charging rack adapted for use with sealed cells which are to be charged in only predetermined positions relative to the horizontal, and further to provide such charging rack with safety features which are adapted to enable the charging racks to be used by untrained personnel with assurance that the cells will be charged sufficiently and properly to a fully charged state within normal charge periods.

Other objects and features of the invention will be apparent from the following description and the appended claims.

In the description of the invention reference is had to the accompanying drawings of which:

FIGURE 1 is a fractional sectional view of a charging rack for a mine lamp storage battery of a mine lamp battery apparatus having the charging terminals in the mine lamp headpiece, taken substantially on the line 1—1 of FIGURE 2;

FIGURE 2 is a front elevation of the charging rack; and

FIGURE 3 is an illustrative charging circuit for use with the present charging rack.

A mine-lamp battery apparatus comprises a battery 10 and a miner's headpiece or head lamp 11 interconnected by a flexible cable 12. The battery is worn on the miner's body as with the use of a belt not shown which is fastened to the battery case 13 by means of a bracket loop 14 on a sidewall of the case. Such bracket may for example comprise a plate 15 provided with a rectangular opening 16 having flanges turned up at opposite sides thereof which are secured by screws 17 to a boss 18 integral with the sidewall of the case. The bracket has opposite wings 19 offset outwardly from the case. The miner's belt is threaded through the space below the wings and through the ends of the bracket opening 16 and across the boss 18.

The battery 10 may comprise one or more individual cells of which three are shown divided by partitions 20.

The cells are provided with individual pressure switches 21a, 21b and 21c each of which stands normally in the position shown in FIGURE 1. In these positions of the switches the cells are connected in series with the lead-out cable 12. However, if any one of the pressure switches is operated by build up of pressure above a preset value in the respective cell the circuit is broken between all the cells and the cable 12 and instead a "short" is connected across the cable.

The miner's headpiece comprises a plastic case 22 housing a light bulb 23 and suitable reflector not shown, the end of the case being closed by a protective glass 24 held in place by a bezel 25. The cable 12 leads out of one side of the case 22 and is connected serially through the bulb 23 and an on-off switch 26 operable by a rotary button 27 extending from a sidewall of the case. The back side of the case is provided with a metal clip 28 by which the headpiece is secured to a miner's cap.

Mine lamp batteries of the sealed type are typically charged through terminals provided in the headpiece. Thus, the headpiece 11 has two connector sockets 29 open at the back of the case in which there are provided respective spring terminals 30 connected to the leads of the cable 12. When the battery is to be charged the headpiece is mounted on a connector plug 31 which engages the terminal 30 and which is connected to a suitable charging source as is hereinafter described.

Each individual cell of the battery 10 comprises a stack of negative and positive electrode plates of which at least each negative plate comprise typically a sintered porous matrix filled with cadmium active material. In accordance with the teachings of the Grieger-Evans application above referred to, the electrode plates of the several cells are disposed in the same relationship to the battery case 13. For example, each cell may comprise a central positive plate 32 and two oppositely positioned negative plates 33a and 33b all extending vertically (along the lengthwise dimension) of the battery case 13. One of the two negative plates of each cell, the negative plate 33a, corresponding to the same side of the battery case is spaced from the adjacent sidewall of the cell. The internal construction and spacing of the electrode plates, together with the extent of filling of the individual cells with liquid electrolyte, is such that when the battery is standing vertical the electrodes are fully covered by electrolyte to permit efficient discharge of the battery but that when the battery is laid on its side 13a opposite the one side just mentioned the electrolyte level in each cell will contact the lower portion or at least the lower side of the then upper electrode plate 33a while leaving the upper side of this electrode plate in contact with the gas space in the cell. To relieve the need for critical control of the level of electrolyte in the individual cells the batteries are charged on their sides 13a with a slight inclination with the horizontal.

The charging circuit itself may be of the type disclosed in the present Fritzinger-Jaffe application, Serial No. 780,981, filed December 17, 1958, now Patent No. 2,999,-969, issued September 12, 1961. Such circuit may be connected to a charging generator not shown through a plug 34 and jack 35. When no battery is connected to the charging terminal 31 the charging circuit is completed through a relay switch 36a, left contact, and a load simulating resistor 37 to provide the circuit with continuity so that a number of individual charging circuits may be connected in series with a common generator. When a battery to be charged is connected to the terminals 31 a safety switch 38 is closed in the manner hereinafter described. When a start switch 39 is pressed closed momentarily the relay 36 is activated by current from the battery to be charged through the safety switch 38. The relay 36 has a second switch 36b which closes in parallel with the switch 39 to provide a holding circuit for the relay. Operation of the relay switch 36a to its right contact shifts connection of the charging source from the load simulating resistor 37 to the battery through the terminal 31. At the same time a red signal lamp 40 is lit by current flow through it and the load resistor 37 but a green signal lamp 41 paralleling the load resistor is not lit because the red lamp has a several times greater resistance than that of the load resistor. When the battery reaches a charged condition causing one of the pressure switches 21 to be operated to disconnect the battery from the charging circuit and to short the terminal 31 the relay 36 is dropped out to return the switches 36a and 36b to their original positions. The red lamp is now lit through the terminal 31 and the green lamp 41 is lit through the switch 38 to indicate that the battery is charged but that the internal pressure has not subsided to render the battery ready for use. When the pressure subsides to return the pressure switch 21 to its normal position the battery becomes connected again across the terminals 31. This reconnection of the battery to the charge circuit causes the red lamp to go off because of the counter voltage then developed across it from the battery and from the charge source but the green lamp stays on to indicate that the battery is charged and ready for use.

The charging rack 42 of the invention shown in FIGURES 1 and 2 incorporate the charging circuit of FIGURE 3 but only the physical disposition of certain components of the charging circuit in the rack need be herein described. The charging rack comprises a base plate 43 supported by adjustable feet 44 at its four corners. Projecting upwardly from the sides of the base plate are sidewalls 45 set back from the front of the plate. About midway the height of the sidewalls the same are bridged by a horizontal partition wall 46 to form there below in the rack a horizontal compartment 47 open to the front. This compartment is of a size adapted to receive the battery 10 slidably in a horizontal position during charge. To this end the right sidewall 45 of the charging rack is recessed at 48 (FIGURE 2) to clear the belt bracket 14 and permit the battery to be inserted in only a correct charging position—a position wherein the aforestated side 13a is to the bottom. The front ledge 43a of the base plate ahead of the side plates is offset downwardly below the bottom wall of the compartment 47 to accommodate the surrounding band 13b of the battery case. In order that a battery inserted in the compartment 47 will be slightly inclined to the horizontal as before described the front feet 44 are adjusted to a higher level than the back feet as shown in FIGURE 1.

Above the battery compartment 47 the charging rack has a front panel 49 preferably inclined rearwardly as shown. Mounted on the central portion of this panel are the charging terminals 31 for engaging the socket terminals 30 and for serving also as hooks onto which the headpiece can be pressed and securely mounted on the rack. At the top of the panel there is provided the pushbutton switch 39, red lamp 40 and green lamp 41. Extending rearwardly from the upper portion of the charging rack is the plug-jack connector 34—35.

In order to assure that the battery will be properly positioned during charge, and that the charging circuit will be dropped out—i.e., the relay 36 returned—if either the battery is removed from a correct charging position or the headpiece is disconnected from the charging terminals during charge, the safety switch 38 is controlled in the charging rack so that it is held operated only when the battery is properly positioned in the compartment 47 and the headpiece is connected to the charging terminals. In other words, if either of these two conditions is not present the safety switch will not be operated. This control over the safety switch is accomplished in a simple manner by a horizontal lever 50 above the battery compartment 47 pivoted at 51 to the front portion of the charging rack and having an inclined feeler finger 52 at its back end extending through an opening 53 in the partition wall 46 into the battery compartment 47 as under the influence of the weight of the lever or of suitable biasing spring not shown. The lever 50 has an upstanding arm 54 at its fulcrum carrying the safety switch 38. This switch may be a so-called micro switch with a pushbutton 38a at its upper side. In line with the upper side of the switch is a plunger 55 extending through the front panel alongside one of the charging terminals 31. This plunger is spring biased forwardly by compression spring 56 into its outward position shown in FIGURE 1. On the back end of the plunger there is a cam face 55a for camming the switch button 38a inwardly into an operated position upon the plunger being depressed while a battery is in the compartment 47 as is herein next described.

When a battery is inserted fully into the compartment 47 the lever 50 is cammed upwardly to shift the switch 38 bodily towards the front panel through a distance equal approximately to the distance of movement of the plunger. This forward movement of the switch 38 by the insertion of a battery into the compartment 47 merely places the switch 38a directly back of the cam face 55a as shown in FIGURE 1. If the headpiece is next mounted on the charging terminals 31 the plunger is pressed rearwardly by the headpiece to cause the switch button 38a to be cammed inwardly to close the safety switch 38. If the battery should next be removed from the compartment 47 the lever 50 will under the influence of its bias be returned clockwise to its original position and will free the switch button 38a from the plunger to cause the safety switch to return to off position. Similarly, if the headpiece removed from the charging terminals while a battery is still in the compartment 47 the plunger is moved forwardly by its biasing means to free the switch button 38a and cause the safety switch to be returned to off position. Thus, the safety switch is closed to condition the charging circuit for a charging operation only when both the battery is properly positioned in the compartment 47 and the headpiece is properly mounted on the charging rack. This control of the safety switch by the battery and headpiece in the charging rack is adapted to safeguard against misoperation of the equipment such as might result in charging failures or in incomplete charging of the batteries, and is adapted to enable the charging apparatus to be used in a safe and dependable manner without need for trained operators.

The particular embodiment of our invention herein described is intended to be illustrative and not necessarily limitative of the invention since the same is subject to changes and modifications without departure from the scope of our invention, which we endeavor to express according to the following claims.

We claim:

1. A charging rack for a mine lamp battery apparatus including a battery, a miner's head lamp having a cable connection with the battery and provided with a pair of terminals for making charging connection with the battery, said battery being of a hermetically sealed type adapted to be charged only while in a predetermined position relative to the horizontal, comprising a pair of charging terminals, means for supporting said head lamp with its terminals in engagement with said charging terminals, a charging circuit connected to said charging terminals, a safety switch in said charging circuit required to be operated to render the charging circuit operative, a holder adapted for receiving said battery in only said predetermined charging position, and means in said holder controlled according to whether a battery is in said holder for operating said safety switch to permit charging only when said battery is in said predetermined position.

2. A charging rack for a mine lamp battery apparatus including a hermetically sealed storage battery having a case of oblong shape and required to be supported on its side in a substantially horizontal position during charge, said apparatus including also a miner's head lamp having a cable connection with said battery and provided with a pair of terminals connected to the battery via the cable, said rack comprising a position-defining compartment for said battery open to the front for receiving and supporting said battery in only said substantially horizontal charging position, said rack having a panel upstanding from said compartment and provided with a pair of charging terminals with means for supporting said head lamp thereon with its terminals in engagement with said charging terminals, and a charging circuit connected to said charging terminals for charging said battery while the battery is in said compartment.

3. A charging rack for a mine lamp battery apparatus including a hermetically sealed storage battery required to be supported in a predetermined position relative to the horizontal during charge and including a miner's head lamp having a cable connection with said battery provided with a pair of terminals connected to said battery via the cable, said charging rack comprising a holder for receiving and supporting said battery only in said predetermined charging position, means for supporting said head lamp on the charging rack including a pair of charging terminals for engaging the terminals of said head lamp while the head lamp is supported by the rack, a charging circuit connected to said charging terminals, safety switch means in said charging circuit required to be operated to condition the charging circuit for operation, and control means for said safety switch means including a first control member on said rack in position adjacent to said supporting means for actuation by said head lamp as the head lamp is mounted on the rack and a second control member in said holder for actuation by a battery as the battery is placed in said predetermined position in said holder, and means for requiring both control members to be actuated to operate said safety switch means.

4. The charging rack set forth in claim 3 wherein said safety switch means comprises a single switch, and means for shifting said switch by one of said control members into a position for operation of the switch by the other of said control members while said one control member is actuated.

References Cited in the file of this patent

UNITED STATES PATENTS

| | | |
|---|---|---|
| 1,800,918 | Wheat | Apr. 14, 1931 |
| 1,981,210 | Wheat | Nov. 20, 1934 |
| 2,021,111 | Wheat | Nov. 12, 1935 |
| 2,312,614 | Wheat | Mar. 2, 1943 |
| 2,375,866 | Nelms et al. | May 15, 1945 |